June 11, 1968

R. R. CHRISTENSON 3,388,195

PLASTIC FOAM PROTECTING OF APPARATUS AND
EQUIPMENT DURING MOVING THEREOF

Filed Nov. 30, 1964

INVENTOR.
Russell R. Christenson

BY

ATTORNEY

United States Patent Office 3,388,195
Patented June 11, 1968

3,388,195
PLASTIC FOAM PROTECTING OF APPARATUS AND EQUIPMENT DURING MOVING THEREOF
Russell R. Christenson, Midland, Mich., assignor to The Dow Chemical Company, Midland, Mich., a corporation of Delaware
Filed Nov. 30, 1964, Ser. No. 414,724
7 Claims. (Cl. 264—45)

ABSTRACT OF THE DISCLOSURE

This invention concerns a method for supporting and protecting the internal sections or elements of apparatus and equipment subject to damage when moved or transported. The method involves placing in the interior of the apparatus or equipment to be moved an expandable resinous material, and then expanding the material to meet and support the internal confines of the apparatus or equipment. In this manner the often fragile or easily dislodged internal sections or elements of such devices can be protectively held in position and lent structural support by the snugly fitting expanded material.

---

Figure 1:
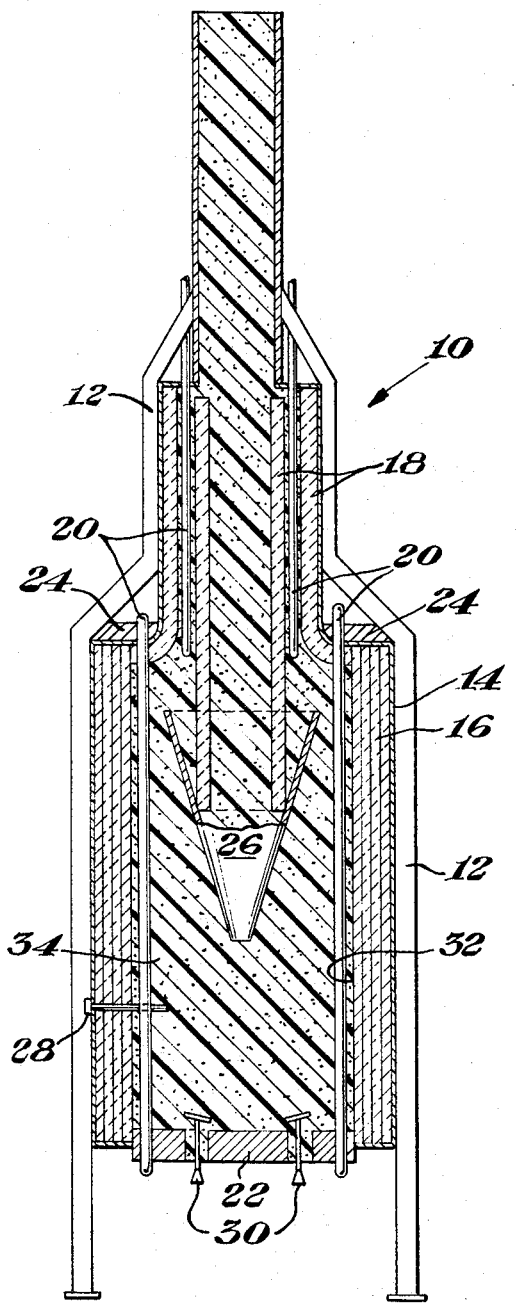

This invention relates to a method for supporting and protecting internal sections or elements of apparatus and equipment subject to damage when the apparatus or equipment is moved. It relates more particularly to a method for supporting and protecting sections or elements of apparatus and/or equipment with plastic foam when such apparatus is moved from one place to another.

Prior to the present invention, the moving of apparatus, especially heavy equipment, e.g., brick lined furnaces, retorts or ladles, often required dismantling or disassembling the apparatus so as avoid damage in transit and reassembling of the equipment at the new location. The moving of brick lined equipment without dismantling, frequently results in cracking or dislodging of much of the lining.

More specifically, as an example, in the heretofore known practice to relocate a Petro-chemical furnace, the tubes are first removed, then the brick lining is removed, and finally the steel shell is dismantled. When moved to the new location, the shell is reassembled, a brick lining is again installed, and the tubes are put back in place. In most instances few, if any, of the old bricks are suitable for reuse, so that a new supply of fire bricks are required, and the tendency of damaging the shell during dismantling, transporting and reassembling is increased. All of these operations are costly and add to the expense of relocating apparatus and equipment.

Accordingly, it is an object of the present invention to provide a novel method for protecting sections and elements of equipment subject to damage during moving so that it can be relocated without dismantling the components thereof.

Still another object of the present invention is to provide a method wherein a foam plastic material is employed to reinforce, support and protect internal fragile components of equipment during its transport and relocation.

Still another object of the present invention is to provide a method wherein a plastic foam material is employed to reinforce, support and protect the internal components of equipment during transportation and relocating, which foam material is readily removed by a disintegrating process after moving and/or relocating is completed.

Briefly, the method of the present invention comprises filling the interior chamber or cavity of an apparatus or piece of equipment having a plurality of internal parts and/or a lining, e.g., a fire brick lining, subject to damage during moving, with a body of foamed plastic which supports and protects said damageable elements during handling and moving, and which expanded plastic material can readily be removed, e.g., by burning or disintegrating with heat or an open flame, or by dissolving said foam plastic in a suitable solvent.

Any foamable organic plastic material can be used in the invention. Among suitable expandable plastics there may be mentioned foamable epoxy resins, foamable phenol-formaldehyde resins, foamable polyurethane compositions, foamable olefin polymers and foamable styrene polymers. Expandable styrene polymers and foamable polyurethane compositions are preferred.

Figure 2:
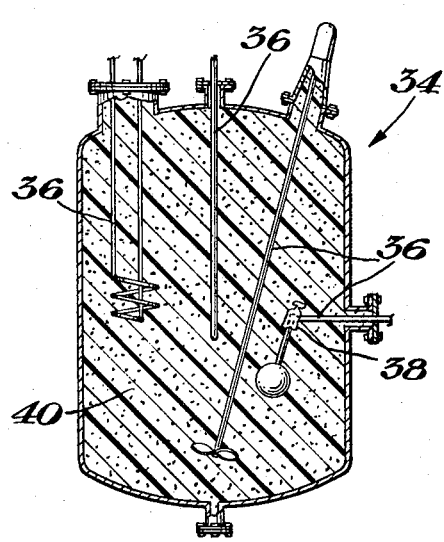

Yet additional objects and advantages of the present invention will be apparent by the ensuing description wherein:

FIGURE 1 is a cross-sectional view of a brick lined furnace filled with an expanded resinous material; and
FIGURE 2 is a cross-sectional view of equipment containing miscellaneous items surrounded by an expanded resinous material.

Referring more particularly to FIGURE 1, there is illustrated a furnace 10 located between upright supports 12. Such a furnace 10 is commonly known as a Petro-chemical furnace.

The furnace 10 includes a thin metallic shell 14. About the internal surface of shell 14 are multiple layers of fire brick 16 secured within the shell by cement, according to the usual custom. Additional brick work 18 is shown located in the stack area of the furnace, in columnar form, to provide the necessary chimney effect. Located intermediate of the columnar brick work 18, and adjacent the periphery of brick layers 16, are a plurality of product carrying tubes 20.

Lowermost tubes 20 are supported between a base plate 22 and an upper support plate 24. A metal heat deflector cone 26 is typically located about the lower end of that part of brick work 18 forming an inner extension of the chimney.

Instruments 28 are shown as protruding through the shell 14 and a portion of brick work 18, and engaged with certain ones of the tubes 20.

Located and supported with the base plate 22 are burners 30 for interjecting a hot flame into the interior of inner chamber 32 of furnace 10.

The furnace 10 is shown as it would be transported rather than in its usual operative state. Therefore, in accordance with the present invention, its internal chamber 32 is shown completely filled with an expanded resinous material 34, the foamed material being located against and foamed in and about the entire internal walls and components of the furnace 10.

Expanded material 34 can comprise a poured-in-place, then expanded urethane resin composition having a characteristic such that the pressure generated when it is expanded, is on the order of, for example, 2 to 6 p.s.i. gauge pressure. Almost any object placed inside of a Petro-chemical furnace would be likely to withstand such an expanding pressure. Such material might be that taught, for example, by U.S. Patent 3,072,582. However, it is to be understood that other plastic foam resins, such as expandable or pre-foamed styrene polymer particles, can be used. For example, foamable polystyrene beads, such as taught by U.S. Patents 2,744,291 and 2,787,809, can be poured or blown into the internal cavity of the equipment, then foamed by heating with hot air or steam to form a coherent mass completely filling the cavity. Other plastic foams likewise might be used where they provide similar characteristics of expansion, resilience, and destructability.

With the urethane foam fill above noted, it is possible to remove the same, after transportation of the equipment has been completed, by burning it out via the flame of burners 30. A solvent, such as toluene or carbontetrachloride, could likewise be used for disintegration of the polystyrene foam, or other similarly effected filling materials.

A modification of the present invention is illustrated in FIGURE 2 wherein a vessel 34 has located therein a plurality of different fragile instruments 36. As with the furnace 10, the interior of vessel 34 can be filled with a foam resin 40 to protect and support the internal components thereof during movement of the vessel. It can readily be appreciated that the instruments 36 will remain in position and be insulated from shock during the transport of vessel 34.

In many instances, it may not be desirable for delicate joints or surfaces of the instruments 36 to be subject to direct contact with the foam resin 40. In such circumstances, these joints or surfaces are preferably covered with a thin metal foil, such as aluminum foil 38, before the resin 40 is expanded. Foil 38 will also continue to protect the delicate joints and surfaces as the resin 40 is disintegrated, as it will generally be resistant to the heat or solvents used to remove the resin 40. It is also conceivable that other wrap materials than foil 38 can be employed to cover delicate joints or surfaces as, for example, a highly radiated cross linked polyethylene film or a polytetrafluoroethylene film, which film is resistant to the particular heat or solvent employed to remove the foam resin 40.

While certain representative embodiments and details have been shown for the purpose of illustrating the invention, it will be apparent to those skilled in the art that various changes and modifications can be made therein without departing from the spirit or scope of the invention.

Accordingly, what is claimed as new is:

1. A method of protectively moving equipment having dislodgable internal components without disassembly of said components from the shell of the equipment, said method comprising the steps of:
   locating an expandable resinous material within the confines of said shell of sufficient quantity at least to fill substantially said confines upon expansion,
   expanding said expandable material until said confines are substantially filled,
   moving said equipment from its present location to its new location while said internal components are locked in position by said expanding resinous material, and
   removing the expanded material after the aforesaid move has been completed.

2. The method of claim 1 wherein said removing step is carried out by burning off said resinous material.

3. The method of claim 1 wherein said removing step is carried out by solvent dissolving of said resinous material.

4. The method of claim 1 wherein at least a portion of an internal component is covered with a wrap material prior to the locating of the expandable resinous material within the confines of said shell.

5. The method of claim 4 wherein said wrap material is metal foil.

6. The method of claim 4 wherein said wrap material is plastic film.

7. A method for protectively moving a furnace including burners and dislodgable inner components, said method comprising the steps of:
   locating an expandable resinous material within the confines of said furnace of sufficient quantity at least to fill substantially said confines upon expansion,
   expanding said expandable material until said confines are substantially filled,
   moving said furnace from its present location to its new location while said inner components are locked in position by said expanding resinous material, and
   burning off said expanded material by firing said burners.

References Cited
UNITED STATES PATENTS

| | | | |
|---|---|---|---|
| 1,341,078 | 5/1920 | Schaefer | 264 |
| 2,632,922 | 3/1953 | Kish | 264 |
| 2,944,170 | 7/1960 | Knapp et al. | 264—45 |
| 3,048,267 | 8/1962 | Starzec | 206—46 |
| 3,097,930 | 7/1963 | Holland | 264 |
| 3,129,836 | 4/1964 | Frevel | 206—46 |
| 3,201,911 | 8/1965 | Woodland | 206—46 |
| 3,229,936 | 1/1966 | Quillinan | 264—45 |
| 3,249,215 | 5/1966 | Kelly | 264—46 |
| 2,780,350 | 2/1957 | Simon et al. | 264—54 XR |
| 2,895,603 | 7/1959 | Freeman | 264—45 XR |

JAMES A. SEIDLECK, *Primary Examiner.*

H. A. BRODMERKEL, D. J. ARNOLD, *Examiners.*

P. E. ANDERSON, *Assistant Examiner.*